United States Patent
Jain et al.

(10) Patent No.: US 7,704,598 B2
(45) Date of Patent: Apr. 27, 2010

(54) DURABLE COVERING FOR CHEMICAL PROTECTION

(75) Inventors: Mukesh K. Jain, Newark, DE (US);
Tim M. Quinn, Glen Mills, PA (US);
Anthony J. Smiley, Wilmington, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 10/922,570

(22) Filed: Aug. 20, 2004

(65) Prior Publication Data

US 2005/0266228 A1    Dec. 1, 2005

Related U.S. Application Data

(60) Provisional application No. 60/574,843, filed on May 26, 2004.

(51) Int. Cl.
*B32B 3/26* (2006.01)

(52) U.S. Cl. ............ 428/316.6; 428/198; 428/543

(58) Field of Classification Search ............ 428/316.6, 428/198, 315.5, 543
See application file for complete search history.

(56) References Cited

U.S. PATENT DOCUMENTS

| | | | | |
|---|---|---|---|---|
| 3,586,596 A * | 6/1971 | Ainsworth et al. | ............ | 442/35 |
| 3,953,566 A | 4/1976 | Gore | ............ | 265/288 |
| 4,067,210 A * | 1/1978 | Arons et al. | ............ | 66/202 |
| 4,187,390 A | 2/1980 | Gore | ............ | 174/102 |
| 4,194,041 A | 3/1980 | Gore et al. | ............ | 428/315 |
| 4,274,848 A | 6/1981 | La Gro | ............ | 55/387 |
| 4,433,024 A * | 2/1984 | Eian | ............ | 428/198 |
| 4,500,581 A * | 2/1985 | Mitomi et al. | ............ | 428/85 |
| 4,510,193 A | 4/1985 | Blucher et al. | ............ | 428/196 |
| 4,532,316 A | 7/1985 | Henn | ............ | 528/59 |
| 4,862,730 A | 9/1989 | Crosby | ............ | 73/38 |
| 4,932,078 A | 6/1990 | Jones et al. | ............ | 2/70 |
| 5,190,806 A | 3/1993 | Nomi | ............ | 428/198 |
| 5,390,531 A * | 2/1995 | Taylor | ............ | 73/40 |
| 5,539,072 A * | 7/1996 | Wu | ............ | 526/304 |
| 5,678,247 A * | 10/1997 | Vickers | ............ | 2/69 |
| 5,731,065 A | 3/1998 | Stelzmuller et al. | ............ | 428/198 |
| 5,989,698 A * | 11/1999 | Mrozinski et al. | ............ | 428/315.7 |
| 6,074,738 A | 6/2000 | von Fragstein et al. | ... | 428/315.9 |
| 6,261,678 B1 | 7/2001 | von Fragstein et al. | ... | 428/315.9 |
| 6,395,383 B1 * | 5/2002 | Maples | ............ | 428/319.3 |

(Continued)

FOREIGN PATENT DOCUMENTS

CA    1107160    8/1981

(Continued)

OTHER PUBLICATIONS

Translation of JP 2002-235248, Taiko et al, "Knitted Fabric of Fibrous Activated Carbon", Aug. 23, 2002.*

*Primary Examiner*—Hai Vo
(74) *Attorney, Agent, or Firm*—Dianne Burkhard

(57) ABSTRACT

A protective covering is described comprising at least one microporous film attached to a functional layer, the protective covering capable of inhibiting the passage of toxic substances therethrough. Preferably the functional layer is an adsorptive layer contained between two oleophobic, microporous films. Additional shell and backer layers may be added to the construction forming a protective covering having good durability, flexibility and high moisture vapor transmission.

82 Claims, 3 Drawing Sheets

U.S. PATENT DOCUMENTS

| | | | |
|---|---|---|---|
| 6,410,603 B1 | 6/2002 | Hobson et al. | 514/759 |
| 7,160,369 B2 | 1/2007 | von Bluecher et al. | 96/132 |
| 2001/0008672 A1* | 7/2001 | Norvell et al. | 428/90 |
| 2003/0216256 A1 | 11/2003 | Axtell et al. | 502/417 |
| 2004/0092188 A1* | 5/2004 | Hsieh | |
| 2005/0076541 A1* | 4/2005 | von Blucher | 36/113 |
| 2005/0252379 A1 | 11/2005 | Von Blucher | 96/154 |
| 2007/0059504 A1 | 3/2007 | von Bluecher | 428/220 |

FOREIGN PATENT DOCUMENTS

| | | |
|---|---|---|
| EP | 0465817 | 1/1992 |
| WO | WO 83/02066 | 6/1983 |
| WO | WO 8302066 | 6/1983 |
| WO | WO 9114496 | 10/1991 |
| WO | WO01/15747 A1 * | 3/2001 |
| WO | WO 03/072242 | 9/2003 |

* cited by examiner

DURABLE COVERING FOR CHEMICAL PROTECTION

RELATED APPLICATIONS

The present application claims the benefit of U.S. Provisional Patent Application 60/574,843, file May 26, 2004.

BACKGROUND OF THE INVENTION

The present invention relates to durable and flexible coverings for chemical and biological protection. More specifically, the invention relates to materials and articles that can be used to afford good protection of persons or contents from exposure to hazardous or noxious agents in the form of liquids, aerosols, vapors, or particulates. Furthermore, the present invention relates to coverings that provide protection for an adequate period of use and for conditions of use intended for protective materials. The durable and flexible coverings for chemical protection provided in accordance with this invention are particularly suited for applications such as articles of clothing, tents, sleeping bags, and the like.

The coverings, as described herein, are used to prevent the transmission of hazardous or noxious chemical and biological agents through their thickness by repelling and adsorbing, absorbing, reacting or otherwise binding, degrading, or destroying such agents. These coverings may be utilized to protect a wearer, user, or contents contained within such coverings from exposure to these hazardous or noxious chemical and biological agents. These agents are often presented in an external environment, outside of the covering, and it is desired to protect the environment contained inside the covering from substantial exposure to such agents. In other instances, as will be described, it may be desired to retain, destroy, or otherwise degrade chemicals in the area internal to the covering. Most significantly it is the aim of this invention to provide this performance for the intended period of use and through the rigors of use.

A number of different means have been described or attempted to provide adequate protection from chemical and biological agents. Well known in the art is the general approach of incorporating materials that are capable of adsorbing the hazardous chemicals. Adsorptive chemical protective systems work by adsorbing the hazardous chemicals into sorbants. Other approaches incorporate chemicals or other components that will react and bind or degrade the hazardous agents, including the catalytic breakdown of such agents. All of these approaches attempt to provide sufficient quantities of adsorptive or catalytic materials to effectively address the necessary level of protection from harmful agents. However, unable to withstand the rigors of use, they fail to provide protection over the intended life and for the intended application of the protective systems. Thus while some address aspects of initial performance, satisfactory performance over the course of use is not achieved. Examples of such approaches are well known, and can be found in a number of patents, such as U.S. Pat. No. 4,510,193 to Blucher et al.

During use protective coverings are exposed to various environments and conditions that lead to performance degradation. Particularly severe are conditions associated with protective coverings employed as protective clothing. Protective clothing is often used when handling dangerous or hazardous materials, for example, in what is commonly referred to as Hazmat applications. Also, protective clothing has been utilized in the protection of civilian and military personnel during the threat of exposure to chemical warfare agents, dangerous biological agents, or otherwise hazardous materials.

If the protective performance of such clothing degrades significantly, a dangerous or even life-threatening situation for the wearer develops with continued use of the system. It is critical to design materials capable of performing well initially, and that are capable of maintaining high performance levels over time and through the rigors of use. Attempts to provide high level long-term performance have resulted in a compromise of design considerations yielding undesirable properties. For example, where monolithic layers are used in protective clothing to provide long-term protection, undesirable conditions may result in physiological stresses being imposed on a wearer. Moreover, by the nature of its use, protective clothing should be flexible, however, flexing can cause the protective components to become dislodged or damaged. Protective clothing can also be subject to a significant amount of abrasion and impact, for example on the knees of trousers. These physical stresses can cause a loss of carbon particulates or beads from the structure reducing protection levels. Additionally, activated carbon fabrics, including carbonized and activated polyacrylonitrile textiles, may become broken and their structures disrupted, potentially leaving localized areas with less than desired levels of adsorptive materials. Physical damage resulting in loss of adsorbent or other protective materials can result in protection levels that are undesired, and even unsafe.

Performance degradation of protective materials also results from exposure to contaminants. For example, when brought into contact with adsorbent materials, various liquid contaminants may be adsorbed or can coat the adsorbents such that their protective performance is severely compromised. Liquid contaminants may include petroleum-based contaminants including diesel fuel and various lubricants or, for example in the case of fire-fighting or rescue uses, materials such as fire-fighting foams or even human blood. Additionally, hazardous chemical agents that present a liquid challenge, for example in the form of liquid drops, can wet into a protective material and directly contact the adsorbents. This will create an extremely high concentration challenge, often overwhelming the adsorption rate and capacity of adsorbents or other functional materials, and resulting in undesired permeation levels of the chemical through the protective covering.

Further, many applications may require that the protective covering undergo repeated cycles of washing and drying. Cycles of washing and drying, particularly with the addition of detergents that can be adsorbed into materials such as activated carbon, present both physical damage and a chemical contamination challenge to the protective materials. Significant degradation of protective performance can often result.

Protective clothing in particular is also subject to contamination from the environment internal to the protective covering such as the environment created by the wearer or user. The wearer can produce significant quantities of sweat, sebum, and other body oils. These materials are capable of contaminating the adsorbents or other functional materials contained in the clothing and can degrade their effectiveness, reducing the protection offered. There also are instances where it may be desired that the protective coverings restrict transmission of agents from the interior area of the covering to the external area. For example, in some applications such as hunting, it may be desired to prevent odiferous vapors or particles from moving through the protective covering to the outside environment, where they might be detected. It is also possible during the course of use that chemical agent vapors may enter the interior area of the protective covering. In the case of protective clothing, agent access may be through cuffs or zippers, or other closures. Where there is leakage into the interior area of the protective covering, such vapors can be absorbed by the skin of the person within the clothing. Current protective constructions using continuous layers of adhesives or films positioned between the wearer and the adsorptive materials in the protective clothing can restrict the passage of agents away from a wearer increasing exposure.

Prior efforts, such as described in U.S. Pat. No. 5,190,806 by Nomi teach the addition of an air impermeable continuous adhesive layer to prevent the passage of liquid contaminants through an outer layer to the inner adsorptive layer. However, constructions incorporating monolithic continuous layers of polymeric films or adhesives will significantly reduce the transmission rate of moisture vapor, or what is commonly also known as "breathability". In the case of protective clothing, this reduction in transmission of moisture vapor will result in significantly increased physiological stresses. The incorporation of air impermeable continuous materials into the construction, may remain "breathable", but require that moisture vapor first absorb into the continuous layers, diffuse through these physical materials, and subsequently evolve from the layers through a solution-diffusion mechanism. Constructions which result in the solution-diffusion process for moisture vapor transport generally result in lower rates of the transport of moisture vapor.

In order to minimize the physiological stresses imposed by the protective covering, it would be desirable to maintain physical passages throughout the protective structure which allow for diffusive transport of moisture vapor. Contiguous air pathways from the internal to the external environments will allow moisture vapor to move through these pathways via a diffusive mode through air. Air permeable constructions in which moisture vapor transport may occur through diffusive transport through air have a higher moisture vapor transport rate (MVTR) than constructions wherein moisture vapor transport is through solution-diffusion. It would be desirable to have a protective construction that maximizes the moisture vapor transport rate in order to minimize the physiological stress, and thus it is desired to maintain contiguous air passages through the protective covering structure.

However, it is also well known that hazardous agents may present themselves in the form of aerosols or particulates. Thus, contiguous air passages through the protective covering structure, if too large in diameter, can allow the direct passage of such agents from the external to the internal environment within the covering. Particularly where agents are carried by wind or other forced flow, protective coverings with large air passages can allow significant transmission of those agents. Previous efforts, such as in WO 83/02066 to Nilsen, have incorporated microporous films to overcome this issue. However, the passage of contaminants and some chemical agents was not prevented where some materials were capable of wetting into and through the described films.

Another way in which coverings for protection against hazardous or noxious chemicals have been previously designed to address physical and contaminant degradation of performance is to incorporate levels of protective materials far beyond what would be necessary without occurrences of degradation. Adding substantially greater quantities of adsorptive materials to the protective coverings, such as activated carbon, can potentially offset the levels of performance degradation. However, in addition to added cost the result is much heavier and bulkier systems than desired.

Applications of protective clothing are particularly sensitive to additional bulk and weight. Added weight presents a greater physical burden to the wearer. It is well known that added thickness and bulk of the protective clothing can substantially reduce the moisture transport from the wearer to the outside environment, as well as create a greater resistance to heat transport, resulting in significantly greater physiological stresses. Furthermore, increased bulk and weight are also undesired characteristics for the packaging, storage, handling, and transportation of these materials. Thus, current solutions have often balanced the need to maintain the performance of protective coverings over the course of their use, despite physical and contamination challenges, and the need to maintain conditions adequate for physiological comfort and safety.

What is greatly desired, and heretofore undisclosed in the art, is a durable protective covering that is not subject to performance degradation. That is, it is desired for the properties of the protective covering to be largely unaffected by physical use, by external contaminants, or by internal contaminants. It is further desired that this protective covering is comfortable and flexible, and minimizes the physiological burden on the user. And it is further desired that this protective covering be capable of preventing the passage of agents in the various forms of liquids, vapors, aerosols, and particulates. Accordingly, a primary purpose of the present invention is to provide a durable covering for protection against hazardous, noxious, or otherwise harmful chemical and biological agents which simultaneously achieves the above objectives.

These and other purposes of the present invention will become evident from review of the following specification.

SUMMARY OF THE INVENTION

As disclosed herein, this invention describes a protective covering that is surprisingly capable of providing very durable protection against hazardous chemical and biological agents while simultaneously maintaining high levels of moisture vapor transport. Protection against agents of various forms, such as liquids, vapors, aerosols, and particulates has also been achieved. Further, the durability levels achieved by this invention allow lighter, less bulky, and more reliable protection over the course of use of the protective coverings.

It has been found that the performance of protective coverings is enhanced by protecting the functional materials with microporous films. It has been discovered that microporous films are extremely useful for limiting airflow and repelling particulates, thus imparting protection against driven vapors, aerosols, powders, and even biological agents. Yet, in contrast to continuous films or monolithic coatings, these microporous films allow the protective covering to maintain contiguous air passages through the thickness of the covering, maximizing moisture vapor transport.

Further, it has been discovered that the use of oleophobic, microporous films provides sustained protective performance over the course of use of the protective covering. Oleophobic microporous films offer resistance to contaminants that would otherwise degrade the performance of the functional materials. Previous efforts to address this have resulted in heavier and bulkier systems, and systems with undesirably low levels of moisture vapor transport.

Preferred protective coverings of the present invention comprise a functional layer between two microporous films, preferably at least one of which is an oleophobic microporous film. The most preferred embodiment contains the functional layer between two oleophobic microporous films. By containing the functional materials between two oleophobic microporous films, it has been found that a higher level of protection from physical loss or degradation of the functional layer can be achieved.

By protecting the functional materials from physical and contamination degradation as described, protective covering materials may be designed which use the least amount of functional materials necessary for initial performance objectives, and which are able to maintain this performance throughout the course of use. This allows for the creation of lighter and thinner materials than would otherwise be created. Furthermore, by achieving this while still maintaining contiguous air pathways through the protective covering, the moisture vapor transport rate is maximized, thus minimizing physiological stress particularly significant to protective clothing applications. Additionally, maintaining these contiguous pathways, while restricting airflow rates and the transport of particulates, offers among the highest levels of protection. These unique and valuable attributes which have been achieved simultaneously are clearly demonstrated in the examples contained herein.

Permeation data of the hazardous chemical agents PMF and 2CES illustrate the improved protection achieved by the present invention by limiting the air permeability of the protective covering through the use of microporous films. Without the use of microporous films, PMF permeation through the protective constructions are greater than 70 $\mu g/cm^2$ (Comparative Examples 1 and 4). With the addition of microporous films to protective constructions, permeation is drastically reduced to less than 0.1 $\mu g/cm^2$.

Importantly, it has also been demonstrated that the use of microporous films does not compromise moisture vapor transmission. By comparing protective constructions with and without microporous films, as demonstrated in Table 5, it can be seen that the incorporation of microporous films which maintain contiguous air passages through the protective covering has negligible impact on moisture vapor transmission rate. However, when microporous films are used containing a monolithic coating, the moisture vapor transmission rate is reduced approximately in half, even where the coating was a highly breathable monolithic coating.

Another remarkable benefit of incorporating oleophobic microporous films to protect the functional materials from contaminants can be seen after exposure to contaminants such a diesel fuel. Protective coverings of the present invention that incorporated oleophobic microporous films performed significantly better than a protective covering having a non-oleophobic microporous film exposed to the diesel challenge. This was particularly evident after exposure to 2CES. Constructions with the non-oleophobic microporous film allowed from approximately 4.5 times to 23 times the permeation of 2CES compared to protective coverings of the present invention having an oleophobic microporous film.

Similarly, also surprising are the results after sebum contamination of a protective covering when comparing chemical protective coverings with and without oleophobic microporous films. Protective coverings without a oleophobic microporous film had 2CES permeation greater than 500 ug/cm$^2$ after contamination by sebum, while chemical protective coverings having oleophobic microporous film had 2CES permeation less than about 3 $\mu g/cm^2$.

It can be further seen in the examples that by containing the functional materials between two microporous films, particularly oleophobic microporous films, the protective performance of the covering can be maintained despite washing and drying. Protective constructions without microporous films lost up to 20% of its activated carbon. No loss was detected with the protective coverings of the present invention.

It is clear that the protective performance of various types of functional layers can be significantly improved through the present invention.

DESCRIPTION OF THE DRAWINGS

The operation of the present invention should become apparent from the following description when considered in conjunction with the accompanying drawings, in which.

DETAILED DESCRIPTION OF THE INVENTION

The present invention is directed to protective coverings that provide good protection against harmful agents such as chemical and biological agents, providing enhanced resistance to liquid penetration and protection against toxic vapors with less weight than conventional materials, while maintaining airflow through the material and having high moisture vapor transmission rate (MVTR).

By "protective covering" is meant a material or article that substantially restricts the passage of noxious or harmful chemical agents and/or biological agents and is intended to be interposed between those harmful agents and that which is meant to be protected. The materials and articles of the present invention include coverings in the form of films, liners, laminates, blankets, articles of apparel, including footwear, gloves, garments such as jackets, and vests, and the like. Thus, the protective covering of the present invention may be used in combination with other garments, for example as a liner to be placed underneath or inside of an existing garment such as a jacket. Alternately, shell and liner fabrics may be added to the outer layers of the protective covering for manufacturing into a final end-use form.

Figure 1:
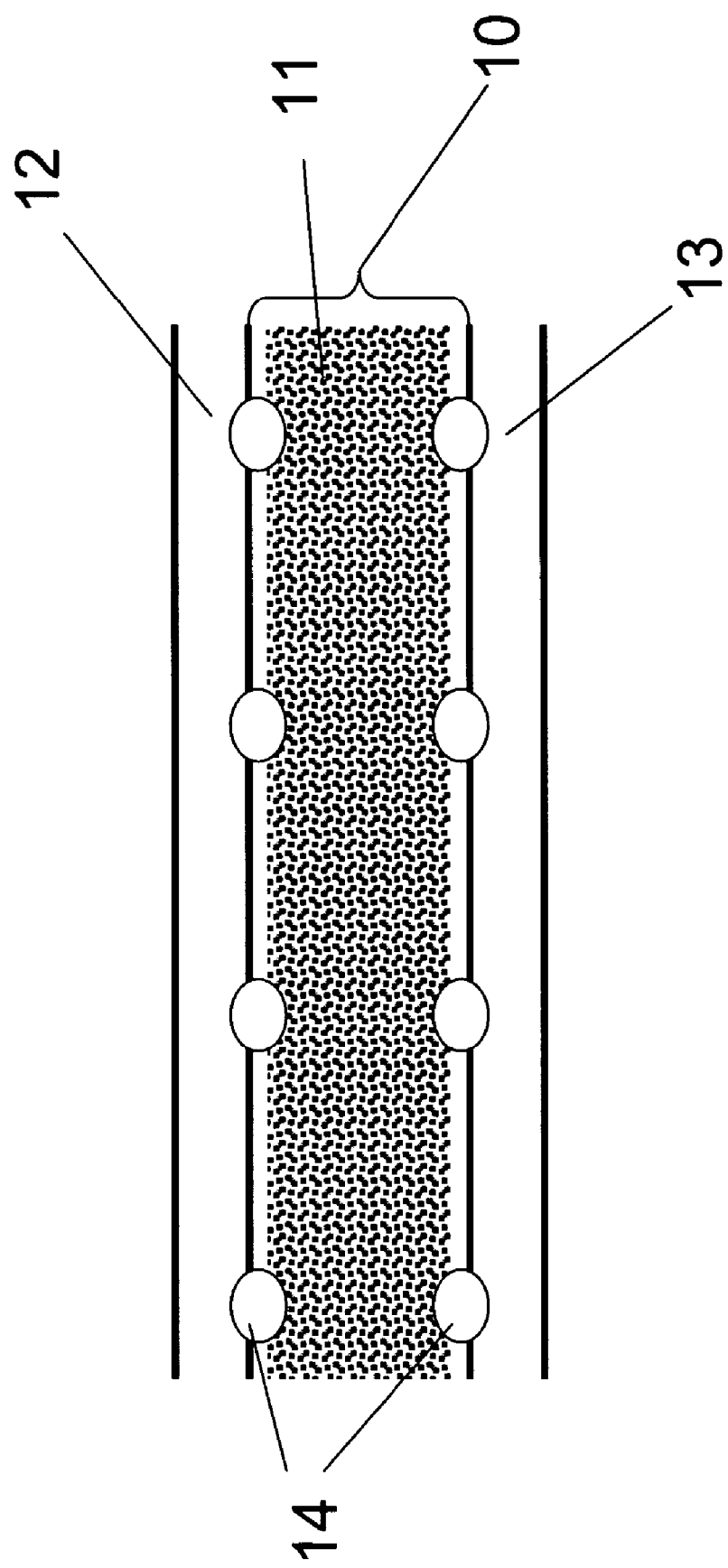
FIG. 1 shows a cross-section of a protective covering of one embodiment in accordance with the present invention.
Figure 2:
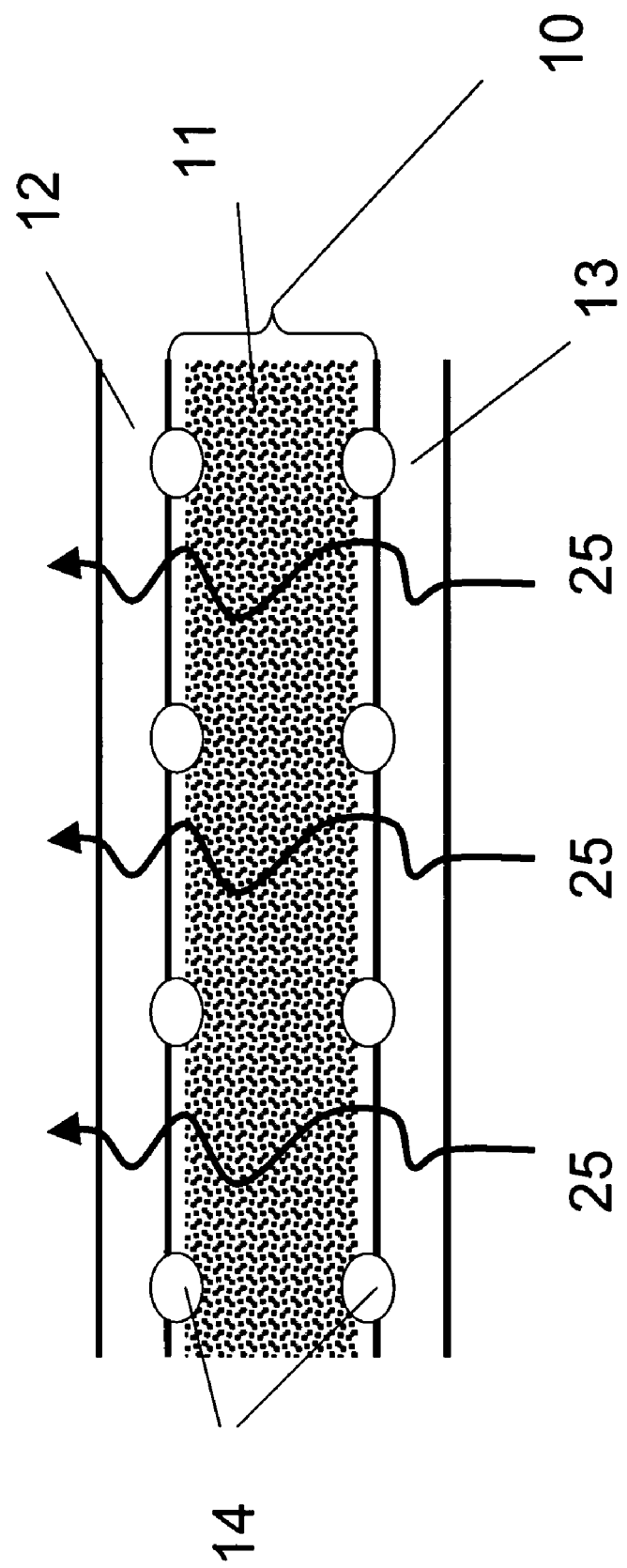
FIG. 2 shows a cross-section of a protective covering of the present invention depicting a continuous path of gas through the covering.
Figure 3:
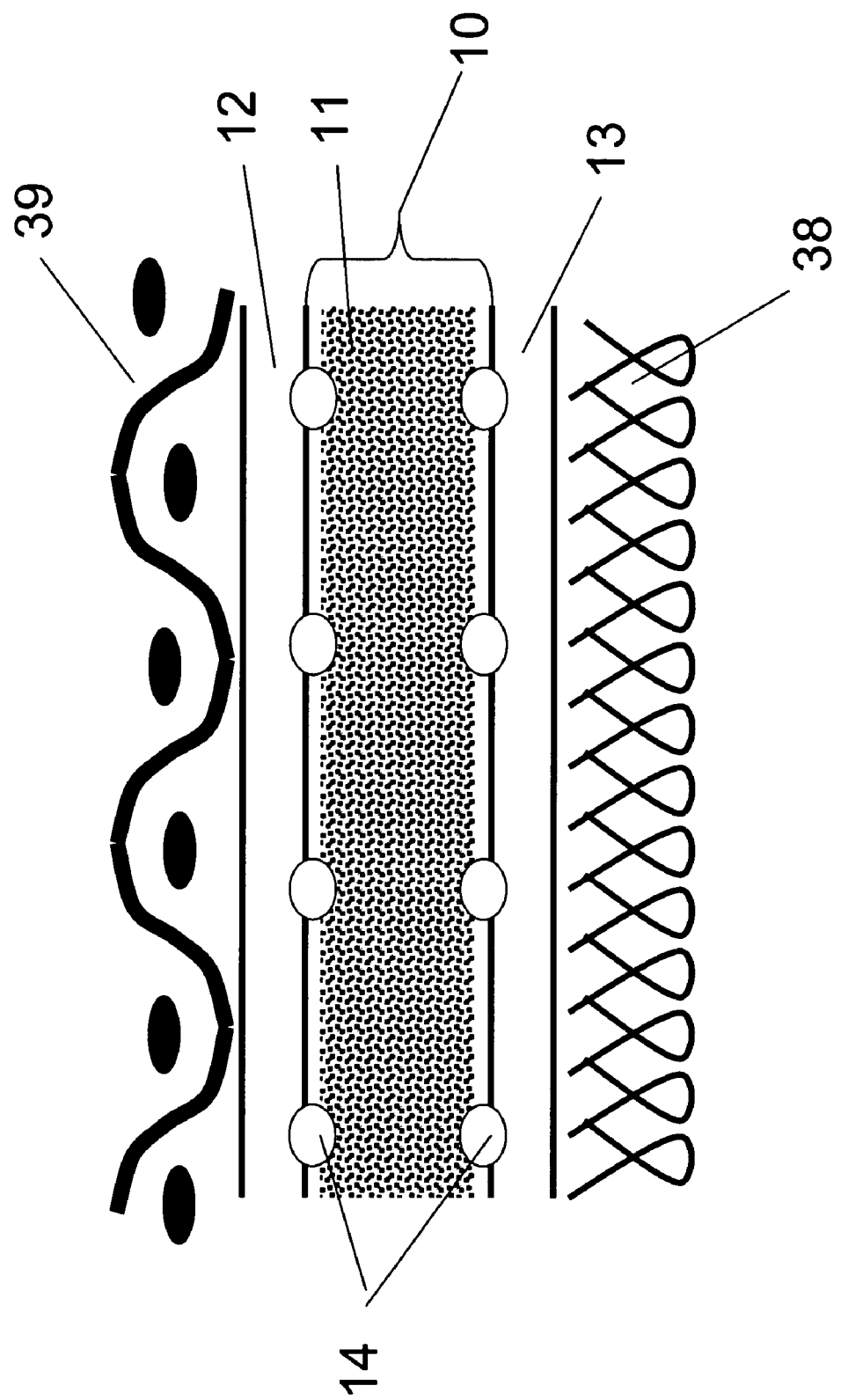
FIG. 3 shows a cross-section of a protective covering of one embodiment in accordance with the present invention having a shell fabric and liner fabric layer.

Referring generally to FIGS. 1-3, and specifically to FIG. 1, one embodiment of the present invention is illustrated wherein a protective covering comprises a functional layer 10 having functional material 11 contained between first and second microporous films 12 and 13, and wherein the functional layer is attached to the microporous films by discontinuous attachments 14.

The functional layer may be a self-supporting sheet such as a foam, textile, paper and the like, and comprises at least one functional material. By "functional material" it is meant a material with one or more of adsorptive, absorptive, reactive and catalytic properties that inhibit the passage of harmful chemical or chemical agents, which as used herein is intended to include chemical or biological agents. Reactive materials include materials that break down noxious chemicals, rendering them less harmful, or which reduce the toxicity of biological agents. Adsorptive materials are capable of adsorbing noxious chemicals.

The functional materials suitable for use in the present invention include adsorptive materials such as zeolites, active clays, activated alumina and silica, diatomaceous earths, molecular sieves, nanoparticles, and activated carbon. Reactive materials are materials that react with and decompose chemical agents including bases such as calcium oxide, magnesium oxides and oxidizing chemicals such as calcium hypochlorite, perborates, sodium persulfate, benzoyl peroxide, zinc peroxide, chlorinated and/or brominated hydantoins, potassium permanganate, potassium monopersulfate, peroxydisulfate and the like. Examples of catalytic materials include metallic silver, palladium, titanium dioxide, vanadium oxide, vanadium oxide supported on magnesium oxide or on titanium oxide (anatase form) and various polyoxometallates such as those described in U.S. Pat. No. 6,410,603 B1. Other examples of functional materials that may be suitable for use in the present invention are described in Table 1 of "Development of a Reactive Topical Skin Protectant", E. H. Braue, Jr., *J. Appl. Toxicol.* 19, S47-S53, (1999, John Wiley & Sons, Ltd.)

Preferred are functional materials comprising carbon such as activated carbon in the form of powders, granules, dried slurries, fibers, spherical beads, and the like. Precursors such as coconut husks, wood, pitch, coal, rayon, polyacrylonitrile, cellulose and organic resins may be used to form the activated carbon. Activated carbon is the generic term used to describe a family of carbonaceous adsorbents with a highly crystalline form and extensively developed internal pore structure. A wide variety of activated carbon products are available exhibiting markedly different characteristics depending upon the raw material and activation technique used in their production. The pores in activated carbon have been classified by the International Union of Pure and Applied Chemistry (IUPAC) as macropores (radius, r>25 nm), mesopores (r=1-25 nm) and micropores (r<1 nm). The micropores are most effective for adsorption of chemical species. Therefore, activated carbons with maximum amount of micropores such as those made from coconut shell, spherical beads from organic resins such as novolak resin and activated carbon fibers are preferred forms. The adsorption properties of activated carbons can be enhanced by treatments with, for example, ammonia, oxidative reagents or chlorine to make them more compatible with certain chemicals. Activated carbon materials are available from a number of companies such as Calgon Carbon Corporation, Norit America Inc., Pica USA Inc., Chemviron Carbon Ltd., Charcoal Cloth International and Kureha Chemical Industry Co. Ltd.

Activated carbon may be combined with at least one other functional material. In one preferred embodiment, functional materials are combined with at least one material selected from adsorptive and reactive materials such as nanoparticular entities, that may be loaded into and onto the surface of activated carbon adsorbent to provide additional protection against biological and chemical agents while still maintaining the adsorptive properties of the carbon. Nanoparticles may be comprised of metal oxide, metal complexes of hydroxides, metal hydrates, and polyoxometallates, and nanoparticles may be further processed to include reactive halogen atoms, alkali metal atoms, metal nitrates, and other metal oxides. Preferred are nanoparticles comprised of oxides from Mg, Ca, Al, and Ti. Nanoparticles suitable for use in the present invention are described, for example, in WO 03/072242 and U.S. Pub. No. 2003/0216256.

In addition to the above functional material, there can also be dispersed at least one additive selected from the group consisting of flame retardants, anti-microbial additives, antioxidants, UV adsorbers, hydrophobic materials such as fluoroacrylates, fluorinated polyethers, fluorourethanes, fluorosilicones and the like.

Functional layers may comprise a range of functional material weight, depending upon the application. Advantageously, the protective constructions of the present invention reduce performance degradation of the functional material, as well as the loss of functional material through the rigors of use, thereby reducing the need for substantial additions of carbon over the amount required to meet the expected level of agent challenge. For example, for applications directed to high level chemical challenge it may be desirable to include greater than 150 g carbon/$m^2$, or greater than 200 g carbon/$m^2$ of the functional layer. In anticipation of light levels of chemical exposure, substantially less carbon may be required, and carbon amounts less than 10 g carbon/$m^2$, or less than 30 g carbon/$m^2$, may suffice. Functional layers comprising activated carbon are preferred which have less than about 200 g carbon/$m^2$, less than about 150 g carbon/$m^2$, and less than about 100 g carbon/$m^2$.

By "functional layer" it is meant the layer comprised of the functional materials which is contained between microporous films or attached to at least one microporous film. It is primarily responsible for the adsorption, absorption, reaction, catalysis, or otherwise the binding, destruction, or degradation of the hazardous or noxious agents, thus preventing the transport of such agents through the protective covering. The functional materials in and of themselves may constitute the functional layer, for example, in the form of an activated carbon cloth including, but not limited to carbonized and activated polyacrylonitrile woven textile. However, combinations of the functional materials with an appropriate substrate may be desirable where it results in a stronger and more durable functional layer than would the use of the functional materials alone. Preferably, functional materials are incorporated into or onto a substrate to form the functional layer. Preferred substrates or forms comprise a sheet, such as a textile or foam. For example, activated carbon particulates or powder may be combined with polymeric binders to be impregnated into a foam such as a porous open cell foam sheet. Preferred foams include open cell polyurethane foams. Functional materials such as activated carbon powders or beads may be coated on to a textile sheet such as a knit or nonwoven textile to form the functional layer. Preferred knit textile supports comprise polyester, nylon, natural fibers, such as cotton, or blends thereof. One preferred protective covering comprises a functional layer comprising an activated carbon-containing sheet contained between first and second microporous films.

A multiplicity of functional materials and functional layers may be combined as a part of the protective covering. It should be understood that the functional layer should be air permeable to maintain the high moisture vapor permeable nature of the protective covering. To protect and extend the useful life of the functional layer while providing a protective covering having high MVTR, air permeable, breathable microporous films are provided to at least one side, and preferably to two sides of the flexible construction. Films having a MVTR of at least about 2000 g/$m^2$/day are preferred. Also preferred are films having a MVTR of greater than 10000 g/$m^2$/day; more preferred films will have a MVTR of at least about 40000 g/$m^2$/day. By "microporous" is meant a material that has very small, microscopic voids. "Air permeable" microporous materials suitable for use in the present invention have small voids or pathways throughout the structure forming a continuous air path from one surface to another. Microporous films suitable for use in the present invention include coatings, layers, films and the like, and should have an average pore diameter less than 10 micrometers, preferably less than 1 micrometer; and a pore volume of 10% to 95%, preferably 50% to 95%. The film can be about 10 to about 300 micrometers in thickness, preferably about 20 to 100 micrometers thick.

Microporous films suitable for use in the present invention include microporous fluoropolymers, e.g., polytetrafluoroethylene (PTFE), expanded polytetrafluoroethylene (ePTFE), tetrafluorethylene/hexafluoropropylene copolymers, polyvinylidene fluoride, poly(vinyl fluoride), and the like; polyolefins, e.g. polyethylene or polypropylene; polyamides; polyesters; polysulfone; poly(ether sulfone); and combinations thereof. Preferred films are porous polytetrafluoroethylene films, and more preferably porous expanded polytetrafluoroethylene films that are described in U.S. Pat. No. 3,953,566, U.S. Pat. No. 4,187,390, and U.S. Pat. No. 4,194,041. Preferred protective coverings comprise at least one microporous film comprising ePTFE. Most preferred protective coverings comprise first and second microporous films comprising ePTFE.

Films that reduce exposure of the functional layer to contaminants such as chemical agents, petroleum, oils, lubricants, as well as sweat, sebum and/or other body oils are preferred. While microporous films provide some protection from contaminants, microporous 'oleophobic' films provide greater protection to the functional layer from contaminants and are thus, most preferred. As used herein, "oleophobic" refers to materials having an oil rating of about three (3) or greater. Preferred embodiments comprise at least one oleophobic microporous film, and further preferred, comprise first and second oleophobic films, wherein the microporous films have an oil rating of three (3) or greater, preferably about four (4) or greater, and most preferably about six (6) or greater, when measured according the methods described in AATCC Test Method 118-1983. In composite materials such as laminates where it may be difficult to obtain direct access to the microporous film for testing, for purposes of the present invention, the microporous film is considered oleophobic if it resists wetting of the AATCC Test Method 118-1983 liquid corresponding to an oil rating of three (3) or greater, preferably four (4) or greater, and most preferably six (6) or greater. By "resists wetting" it is meant that the test liquid does not substantially wet into and/or wick through the pores of the microporous film under conditions of about atmospheric pressure and approximately room temperature.

If the microporous polymer is not naturally oleophobic, it may be rendered oleophobic by coating it with an oleophobic material. Usually oleophobic materials are applied in liquid form, e.g. a melt, solution or latex dispersion, to the film surface until the desired oleophobicity is achieved. Preferably, the internal surfaces of the microporous structure are coated, but in a manner that substantially maintains the moisture vapor permeability and airflow properties of the film. Preferred oleophobic compositions comprise at least one material selected from fluoroacrylates, fluorinated polyethers, fluorourethanes, fluorosilicones, and amorphous fluoropolymers; most preferred are compositions comprising at least one material selected from perfluoropolyethers and perfluoropolyacrylate. Further preferred are fluoroacrylate emulsions. Other oleophobic compounds and methods of application suitable for use in the present invention include those described in U.S. Pat. No. 6,261,678, which is hereby incorporated by reference.

A preferred protective covering comprises at least one microporous film having an oil rating of about three (3) or greater, or four (4) or greater, wherein the microporous film is attached to the functional layer on the side of the protective covering most likely to receive a challenge, e.g., by a chemical agent or POL. The oleophobic microporous film thereby protects the functional layer from contaminants such as diesel fuel and the like. A second oleophobic microporous film is preferably attached to the functional layer on the side of the protective covering on which exposure to sweat and body oils is anticipated. Microporous films having an oil rating of about three (3) or greater, and preferably about four (4) or greater, are preferred to prevent the passage of sebum into the functional layer.

In addition to protecting the functional layer from sweat and sebum, the second microporous layer located between the body of the wearer and the functional layer provides protection in the event that any noxious chemicals are transmitted between the wearer and the protective covering. For example, where chemicals pass through a wrist opening, a microporous layer adjacent the wearer may allow chemical penetration through to the functional layer to be adsorbed by the functional material. In contrast, a continuous layer adjacent the wearer will slow passage of the chemical to the functional layer as chemicals permeate through a slower solution-diffusion mode, thereby exposing the skin to agent absorption.

In one alternate embodiment of the present invention, a protective covering is formed comprising one microporous film and a functional layer. Where only one microporous film is present, it is preferred that the microporous film is attached on the side of the covering most likely to receive a challenge from a chemical agent. It is further preferred that the protective covering has an oil rating of four (4) or greater, six (6) or greater or an oil rating of seven (7) or greater. A backing material may be attached to the protective covering on the side closest to the body of the wearer, and it is preferred that the backer is oleophobic and resistant to sebum and sweat.

Containment of the functional layer between the microporous sheets may be accomplished in any manner which does not disrupt airflow and transmission of gases 25 (FIG. 2) through the chemical protective covering. It is further preferred that containment of the functional layer is capable of eliminating or minimizing loss of the carbon from the protective covering. Attachment of the functional layer to one or more than one microporous film may occur, for example, around the periphery, or attachment may be discontinuous across the layers. Suitable means include but are not limited to the assembly of layers with discontinuous attachment means, including discontinuous adhesive bonds such as discrete adhesive dots, discrete patterns of adhesive or point bonding, mechanical attachments such as sewn connections or other fixations, fusible webs and thermoplastic scrims. Discontinuous attachment of the functional layer to at least one microporous film by adhesive bonds is preferred. Preferred adhesives include hot melt, moisture cure, two part epoxies, and the like known in the art for joining materials. Particularly preferred adhesives comprise polyurethane, polyester and polyamides. While the amount of adhesive may vary, it is preferred to apply sufficient adhesive to provide, for example wash durability to the structure and to reduce the loss of functional material, while preserving the airflow and high MVTR of the protective covering. Adhesive coverage of about 15% to about 85% of the surface is generally preferred.

At least one additional material such as shell fabrics and backing materials may be provided to each microporous film to form the protective covering of the present invention, and may provide further protective properties. FIG. 3 illustrates an embodiment wherein at least one additional material, preferably a shell fabric 39, is adjacent a first microporous film and on the side of the microporous film opposite the functional layer, and forms the outer layer of a protective covering. The at least one additional material may be attached in any manner known in the art, provided transmission of air flow is maintained. For example, at least an additional material may be discontinuously attached through attachments. Further, at least one second additional microporous film, a backing material 38, is adjacent a second microporous film on the side of the microporous film opposite the functional layer, and forms an inner layer of the protective covering on the opposite side.

Shell fabric is often the layer exposed to the elements or first exposed to chemical or biological agents. It can be any air permeable textile, but is preferably a woven made of polyamide, polyester, aramid, acrylic, cotton, wool and the like. The backing material is typically the inner layer of the construct and can be, for example, a knit, woven, or nonwoven. The materials may also be treated to provide additional protection, for example, to be rendered hydrophobic and/or oleophobic. The fabrics may be additionally treated to impart fire retardant properties.

Enhanced protection against chemical agent penetration has been realized by the protective coverings of the present invention. Moreover, the ability to maintain enhanced performance after abuse and exposure to substances known to degrade performance of protective garments has been realized by the present invention. It has been surprisingly found that the protective coverings of the present invention provide protection against 2CES after contamination by diesel fuel, sebum and/or repeated wash/dry cycles when tested according to the methods described herein.

Thus, preferred protective coverings of the present invention have a 2CES and PMF permeation of less than 100 $\mu g/cm^2$, less than 50 $\mu g/cm^2$, further preferred have less than 30 $\mu g/cm^2$, and most preferred, have less than 20 $\mu g/cm^2$ permeation to 2CES and PMF after contamination by diesel fuel, preferably where the diesel fuel contamination occurs on the side of the protective covering having an oleophobic microporous film. Preferred protective coverings of the present invention have a 2CES and PMF permeation of less than 50 $\mu g/cm^2$, and most preferably less than 20 $\mu g/cm^2$, after contamination by sebum, preferably where the sebum contamination occurs on the side of the protective covering having an oleophobic microporous film. Preferred protective coverings of the present invention have a 2CES and PMF permeation of less than 50 $\mu g/cm^2$, and most preferably less than 20 $\mu g/cm^2$, after 6 wash/dry cycles. For purposes of the present permeation is measured and contamination by diesel fuel and sebum, and wash/dry abuse is performed according to the test methods described herein.

Protective coverings of the present invention are "air permeable," which as used herein means that the protective coverings, having at least one microporous film, preferably two microporous films, a functional layer, and optional additional materials, have contiguous air pathways from one surface of the protective covering to the other side of the protective covering. Preferred protective coverings have a Gurley number of less than 120 seconds when measured according to the test method provided herein for air permeability.

Moreover, the moisture vapor transmission rate of the protective coverings is preferably greater than 2000 $g/m^2/day$, more preferably greater than 4000 $g/m^2/day$, and further preferred, greater than 6000 $g/m^2/day$, when measured according to the test method provided herein for MVTR. Preferred protective coverings comprising first and second microporous films, and optional additional materials, also comprise a MVTR greater than 2000 $g/m^2/day$, greater than 4000 $g/m^2/day$, and further preferred greater than 6000 $g/m^2/day$.

Test Methods

Air Permeability—Gurley Number Test

Gurley numbers were obtained as follows.

The resistance of samples to air flow was measured by a Gurley densometer (per ASTM D726-58) manufactured by Teledyne Gurley, Troy, N.Y. The results are reported in terms of Gurley Number which is the time in seconds for 100 cubic centimeters of air to pass through 6.54 $cm^2$ of a test sample at a pressure of 1.215 $kN/m^2$ of water. Since it is difficult to get a good seal in this test with a woven textile, the functional layers were tested without the nylon/cotton shell fabric layer on top.

Oil Repellency Test

Oil Rating was measured using the AATCC Test Method 118-1983 when testing films. The higher the number, the better the oil repellency.

Moisture Vapor Transmission Rate (MVTR) Test

Moisture vapor transmission rate (MVTR) was determined using the procedure set forth in U.S. Pat. No. 4,862,730 using potassium acetate as the salt, and open pore ePTFE for the waterproof moisture vapor permeable membranes. The environment was maintained at 50% relative humidity. The water bath was maintained at 23±0.5° C. The samples were conditioned on the bath comprising a membrane that was stretched across the bath. The membranes nominally had a porosity of between 75% and 80%, average pore size of 0.2 um, with a thickness of approximately 0.04 mm. The samples were placed on top of the membrane with the shell fabric (nylon/cotton) facing up and a cup placed on top of the sample on the shell fabric. The cup was placed on top of the sample for about 15 minutes before starting the test. The MVTR number is reported in the unit of $g/m^2/day$.

Permeation of Bis-2-Chloroethyl Sulfide (2CES) Test

Chemical permeation testing and analysis were adapted from "Permeation and Penetration testing of Air-Permeable, Semi-permeable and Impermeable Materials with Chemical Agents or Simulants (Swatch Testing)", protocols outlined in U.S. Army Test and Evaluation Command, Test Operating Procedure (TOP 8-2-501 Revision 17 January 2002) and Laboratory Methods for Evaluating Protective Clothing Systems Against Chemical Agents, CRDC-SP-84010 (June 1984). Testing was completed at Geomet Technologies, Inc., Gaithersburg, Md. A description of the test apparatus and experimental conditions follows.

The permeability to bis-2-chloroethyl sulfide (chemical structure Cl—$CH_2CH_2$—S—$CH_2CH_2$—Cl), referred to as "2CES", was determined using equipment consisting of a series of test cells in which samples are placed. The entire test cell assembly is placed within an environmental chamber in which the temperature is controlled to 32° C. Each cell consists of an upper and lower section, termed cell top and bottom. The airflow in the cell top is maintained at 0.25 liter/minute and in the cell bottom at 0.3 liter/minute for samples that have low air permeability (<20 $cm^3/min\ cm^2$ airflow at $\Delta P$ of 0.19 mm Hg or 0.1 iwg). Pressure difference ($\Delta P$) across the sample is maintained at zero (0). This mode is also referred to as "Diffusive Penetration Test". The temperature of these air streams is controlled to 32°±1.1° C. and the relative humidity (RH) is controlled at 80±8%. Nominally 8 drops of 2CES (1 ul each) are placed on the side of the sample having the nylon/cotton shell fabric. The area exposed to the 2CES challenge is about 10 $cm^2$.

The top cell airflow is sent to waste stream. 2CES vapor that has permeated through the sample is swept into the bottom air stream and captured downstream via solid sorbents and liquid impingement. A different set up known as "Convective Flow Penetration Test" is employed for samples that are highly air permeable (>20 $cm^3/min\ cm^2$ airflow at $\Delta P$ of 0.19 mm Hg or 0.1 iwg). In this set-up, a pressure differential ($\Delta P$) equivalent to a 0.1 iwg (inches water gauge) is maintained across the sample. Liquid drops are placed on the surface of the test swatch and air is drawn into the top of the convective flow tube and through the test swatch. Effluent air from the cell bottom is diverted to solid sorbents and liquid impingement for collection and analysis.

The solid sorbent and liquid from the impinger are analyzed via colormetric/fluorometric techniques described in the reference materials above. Permeation data is reported as the cumulative mass over a 20 hour duration in units of micrograms/cm$^2$ ($\mu$g/cm$^2$) for each sample. The resolution and lower limit of detection of this test was about 0.1 $\mu$g 2CES/cm$^2$.

When chemical permeation testing after contamination with, for example, diesel is desired, the side having the nylon/cotton shell fabric layer of the protective covering is challenged with 2 ml of diesel fuel. After about 1 hour, the excess liquid is drained off and blotted before application of 2CES drops. Permeation of 2CES is then measured as described above. When chemical permeation testing after contamination with sebum is desired, sebum is applied according to the method described herein for synthetic sebum application, and permeation of 2CES is then measured as described above. Similarly, chemical permeation testing is also conducted after wash/dry cycles performed according to the laundering procedure described herein.

Permeation of Pinacolyl Methylphosphono Fluoridate (PMF) Test

Permeation of PMF was measured using a similar procedure as outlined above for 2CES analysis with the following exceptions. Ten (10) drops of PMF were used in place of 8 drops of 2CES. When chemical permeation measurement after contamination with wet sweat is desired, about 2 milliliter (ml) of simulated sweat (prepared as described in the TOP procedure referenced above) is placed on the interior side of the swatch. After about 1 hour, excess liquid is drained off of the sample by tilting the sample, blotted and then drops of PMF are placed on the nylon/cotton shell fabric side. The environmental conditions employed are similar to those described for 2CES permeation described above. Prior to PMF permeation measurements some samples were contaminated with diesel. Prior to PMF permeation measurements other samples were subjected to wash/dry cycles according to the methods described herein prior to contamination with wet sweat.

The analysis procedure used for PMF analysis is substantially similar to the Enzyme Inhibition test method as described in the document titled "Laboratory Methods for Evaluating Protective Clothing Systems Against Chemical Agents", CRDC-SP-84010 (June 1984). Results are reported as permeated cumulative amount during a 20 hour period. The unit used is $\mu$g/cm$^2$. The lower limit of detection for this test method was about 0.000046 $\mu$g/cm$^2$.

Synthetic Sebum Application Procedure

A 10% synthetic sebum emulsion is employed to contaminate the sample on the side of the swatch opposite the nylon/cotton shell fabric.

30 g of 10% synthetic sebum emulsion was prepared as follows. 3 gram of Synthetic sebum (purchased from Scientific Services S/D Inc., Sparrowbush, N.Y.) was added to 9 gm of distilled water in a glass vial. It was heated under hot water from faucet and shaken to obtain a uniform suspension. 18 gm of buffer solution having a pH of 10 (Purchased from Fisher Scientific, Pittsburgh, Pa.) was added to the vial and was shaken vigorously by hand to obtain a uniform emulsion.

A 2.9" (about 7.4 cm) diameter sample was challenged in the center with 0.4 gm of synthetic sebum emulsion prepared above. A 4"×4" (about 10 cm×10 cm) glass plate was placed on top followed by 4 lb (about 1.8 kg) weights. The assembly was transferred to an air-circulated oven maintained at 32° C. and allowed to sit undisturbed for 2 hours. The weights and the glass plate were removed and the sample was allowed to sit for an additional 2 hours in the oven. The sample was removed from the oven and allowed to condition to ambient conditions before sending for chemical permeation testing.

Laundering Procedure

Six (6) wash/dry cycles were performed on a 12"×12" (about 30 cm×30 cm) size sample using a front loading washing machine, also referred to as "Milnor Washer". The detailed procedure used for washing and drying was according to MIL-DTL 32102 (3 Apr. 2002), titled "Detailed Specification JSLIST Coat and Trouser, Chemical Protective". The detailed laundering instructions can be found in appendix A of this document. Any commercial dryer capable of drying the items at about 120° F. (about 49° C.) can be employed.

Weight Loss Measurement During Laundering

Samples having a size of about 12×12" (about 30 cm×30 cm) were conditioned in the laboratory for 2 hours at 70° F. (about 21° C.) and 65% RH and weights were recorded. These were then laundered 6 times as per the procedure described above. The laundered samples were conditioned and weighed again. Activated carbon loss during wash/dry cycles was calculated as follows.

$$\% \text{ Carbon loss} = \frac{\text{Sample wt. before wash} - \text{Sample wt. after wash}}{\text{Sample wt. before wash} \times 0.42} \times 100$$

Where, 0.42 represents the approximate fraction of carbon in the sample. The calculation assumes that all the weight loss during wash is from loss of activated carbon in the sample.

EXAMPLES

Comparative Example 1

An activated carbon impregnated knit functional layer having no microporous films was prepared and tested for chemical permeation, air permeability and moisture vapor transmission rate (MVTR).

A commercially available activated carbon impregnated knit functional layer designated as "C-Knit bi-laminate" (Style # 04.01.07) was obtained from Lantor (UK) Ltd, Bolton, UK. The functional layer consisted of a knit impregnated with about 115 grams activated carbon adhered to a second knit. It was layered with a nylon/cotton woven shell fabric (nyco) with hydrophobic/oleophobic treatment. The nyco fabric having a weight of 6.5 oz/yd$^2$ and a woodland camo pattern with rip-stop was purchased from Bradford Fabric, Inc., Bradford, R.I.

The resulting construction was tested for chemical permeation, moisture vapor transmission rate (MVTR) and air permeability (Gurley method) using procedures described herein. Chemical permeation of the samples was measured before and after 6 wash/dry cycles. Washings were performed according to the laundering procedures described herein. The samples were contaminated with diesel (on the shell fabric side) and with synthetic sweat or sebum (on the side opposite the shell fabric) and tested for chemical permeation. The results are reported in Table 1. An increase in PMF permeation was detected after contamination with diesel fuel. The 2CES permeation was high after 6 wash/dry cycles and after sebum contamination and was even higher after diesel contamination.

The samples had good MVTR and high air permeability (Gurley measurement) as shown in Table 2. The values reported are an average of 3 measurements. The samples lost approximately 20% activated carbon during washing.

Example 2

An activated carbon impregnated knit functional layer between two oleophobic microporous films was prepared and tested for chemical permeation, air permeability and moisture vapor transmission rate (MVTR).

Micro-porous ePTFE film layers were added to both sides of the carbon functional layer described in Comparative Example 1. The ePTFE film weighed about 21 gm/m$^2$, had 70-85% porosity with an average pore size of 0.2 microns. The film was pre-treated with an oleophobic polymer substantially according to the teachings of U.S. Pat. No. 6,074,738. Resulting film had an oil rating of >6. The films were adhered to the carbon functional layer using a hot melt moisture cure polyether polyurethane adhesive (made according to U.S. Pat. No. 4,532,316) using discontinuous dots providing a 30-40% surface coverage. Additionally, a polyester knit (style # P837) from Milliken & Company, Spartanburg, S.C. was laminated to the side facing the body using the same process as described above. The side of the multi-layer substrate opposite the polyester knit was layered with a nyco shell fabric (as described in Comparative Example 1 above) and tested for MVTR and air permeability, and chemical permeation before and after wash/dry cycles and/or contamination. The procedures were performed according to the methods described herein. The results of chemical permeation are included in Table 1. Permeation of PMF and 2CES chemicals was lower when compared to constructions without the microporous film layers (Comparative Example 1) particularly after diesel and sebum contamination.

The improved protection from chemical permeation was achieved without significant loss in MVTR as shown in Table 2. The Gurley values indicate that the construction having microporous layers is air permeable. No significant loss of carbon was detected after wash.

Example 3

An activated carbon impregnated knit functional layer between two microporous film layers was prepared and was tested for chemical permeation, air permeability and moisture vapor transmission.

A carbon functional layer was prepared similarly to Example 2 except the ePTFE film used on the shell fabric side did not have an oleophobic treatment. The film employed weighed about 17 gram/m$^2$, had 70-85% porosity and average pore size of 0.2 microns. The film was prepared substantially according to U.S. Pat. No. 3,953,566. The resulting functional layer was layered with a nyco shell fabric and tested for MVTR and air permeability, and chemical permeation with and without wash/dry cycles and contamination. The procedures were performed according to the methods described herein. The results of chemical permeation are included in Table 1.

The PMF permeation was lower than samples having no film layers (Comparative Example 1). The 2CES permeation after diesel contamination was higher when compared to samples having oleophobic films (Example 2) and was lower than samples having no microporous film layers (Comparative Example 1).

Results included in Table 2 illustrate that the MVTR and air permeability were comparable to those for sample prepared according to Example 2. There was no significant carbon loss after washing.

Tables 1 and 2 report permeation data for samples having a functional layer (Comparative Example 1), samples having a functional layer between two oleophobic microporous sheets (Example 2), and samples having a functional layer between two microporous sheets wherein the side exposed to chemical agents is not oleophobic (Example 3).

TABLE 1

PMF And 2CES Permeation in µg/cm$^2$.

| Chemical | Wash Cycles | Contaminant | Comp. Ex. 1 | Ex. 2 | Ex. 3 |
|---|---|---|---|---|---|
| PMF | None | None | 74.6 | <0.1 | <0.1 |
| PMF | 6 wash/dry | wet sweat | 79.6 | <0.1 | <0.1 |
| PMF | None | Diesel | 128.2 | 26.15 | — |
| 2CES | 6 wash/dry | None | 331 | 3.4 | — |
| 2CES | None | Diesel | 1194 | 18 | 80.9 |
| 2CES | None | Sebum | 578 | 2.3 | — |

TABLE 2

Moisture Vapor Transmission, Air Permeability And Carbon Loss

| TEST | Comp. Ex. 1 | Ex. 2 | Ex. 3 |
|---|---|---|---|
| MVTR, g/m$^2$/24 hr | 8210 | 6060 | 6040 |
| Gurley, sec | <1 | 48.1 | 49.6 |
| Carbon loss after 6 wash/dry, % | 22.1 | None | None |

Comparative Example 4

An activated carbon impregnated foam functional layer was prepared without microporous films, and tested for chemical permeation, air permeability and moisture vapor transmission rate (MVTR).

An activated carbon impregnated foam was made according to the teachings of the Canadian patent # 1107160 (with the exception neither fluorochemical resin "Scotchgard FC 208" nor "Tinotop T-10" was employed). The foam had an activated carbon content of about 100 g/m$^2$. This was calendered to reduce the thickness to about 20 mils (about 500 microns) and was laminated to a polyester knit (style # P837 from Milliken & Company) using a 17 g/m$^2$ polyamide hot melt web adhesive (Style # PA1001-050-059H) from Spunfab located in Cuyahoga Falls, Ohio. The lamination was performed at about 150° C. and about 50 psi pressure. The activated carbon-containing foam laminate construction was layered with the nyco shell fabric described in Comparative Example 1, so that the polyester knit side faced away from the nyco fabric. The construction was tested for MVTR and air permeability, and chemical permeation before and after wash/dry cycles and contamination. The procedures were performed as described herein. The chemical permeation results reported in Table 3 show similar performance as the results of samples made according to Comparative Example 1, the results of which are reported in Table 1.

The MVTR and air permeability are reported in Table 4 and are similar to results obtained for samples prepared according to Comparative Example 1, as shown in Table 2. The carbon loss after wash was lower than carbon loss of the samples of Comparative Example 1.

Example 5

An activated carbon impregnated foam function layer between two oleophobic micro-porous films was prepared and tested for chemical permeation, air permeability and moisture vapor transmission rate (MVTR).

The procedure was similar to that of Example 2 above except that the functional layer employed was the calendered carbon impregnated foam used in Comparative Example 4. Oleophobic micro-porous ePTFE film layers (oil rating of >6) were added to both sides using hot melt adhesive followed by a knit layer. This was then layered with the nyco shell fabric described in Comparative Example 1. The resulting construction was tested for MVTR and air permeability, and chemical permeation before and after wash/dry cycles and contamination. The results of chemical permeation are reported in Table 3.

The permeation of both PMF and 2CES has been reduced by addition of oleophobic microporous films compared to samples prepared with no films (Comparative Example 4).

As shown in Table 4, there was a slight reduction in MVTR compared to samples prepared according to Comparative Example 4; Gurley value indicate that the multi-layer system is air permeable. No loss of carbon was observed during washing.

Example 6

An activated carbon impregnated foam functional layer between microporous films was prepared and was tested for chemical permeation, air permeability and moisture vapor transmission rate (MVTR).

A carbon foam functional layer was prepared similar to Example 5 except the ePTFE film used on the shell fabric side did not have an oleophobic treatment. The microporous film without oleophobic treatment as described in Example 3 was employed. The resulting construction was layered with the nyco shell fabric and tested for MVTR and air permeability, and chemical permeation with and without wash/dry cycles and contamination. The results of chemical permeation are reported in Table 3.

The PMF permeation values are similar to values obtained for samples prepared according to Example 5 and lower than values obtained for samples prepared according to Comparative Example 4. 2CES permeation after diesel contamination is higher than sample prepared according to Example 5 (samples having an oleophobic microporous film) and lower than sample prepared according to Comparative Example 4 (having no microporous films present). The air permeability and MVTR were comparable to samples made according to Example 5. No carbon loss was observed during wash as reported in Table 4.

Tables 3 and 4 reports data for samples having a functional layer (Comparative Example 4), samples having a functional layer between two oleophobic microporous sheets (Example 5), and samples having a functional layer between two microporous sheets wherein the side exposed to chemical agents is not oleophobic (Example 6).

TABLE 3

PMF and 2CES Permeation in µg/cm2.

| Chemical | Wash Cycles | Contaminant | Comp. Ex 4 | Ex. 5 | Ex. 6 |
|---|---|---|---|---|---|
| PMF | None | None | 76.9 | <0.1 | <0.1 |
| PMF | 6 wash/dry | Wet sweat | 84.9 | <0.1 | <0.1 |
| 2CES | 6 wash/dry | None | 556 | <0.1 | — |
| 2CES | None | Diesel | 1140 | 9.4 | 219.2 |
| 2CES | None | Sebum | 514 | 1.7 | — |

TABLE 4

Moisture Vapor Transmission, Air Permeability and Carbon Loss.

| Test | Comp. Ex. 4 | Ex. 5 | Ex. 6 |
|---|---|---|---|
| MVTR, g/m²/24 hr | 7910 | 5780 | 5460 |
| Gurley, sec | <1 | 44.7 | 60.5 |
| Carbon loss after 6 wash/dry, % | 11.3 | None | None |

Example 7

Moisture Vapor Transmission rate (MVTR) measurements were performed on constructions containing activated carbon functional layer and activated carbon functional layer between two microporous ePTFE layers with and without a continuous breathable polymer layer.

A commercially available activated carbon impregnated knit functional layer was obtained and layered with the nyco fabric on one side (as described in Comparative Example 1) and with P837 knit layer (as described in Example 2) on the other side. MVTR measurements were performed with the nyco side facing away from the bath using the procedures described herein. The results are reported in Table 5. A second construction was prepared by layering the function layer with microporous ePTFE films on each side. The non-oleophobic film employed weighed about 17 g/m², had 70-85% porosity and average pore size of 0.2 microns as described in Example 3. The construction was then layered on one side with the nyco and with P837 knit on the other side and MVTR was measured. Three measurements were taken in each case and the average MVTR values are reported in Table 5.

A comparative sample was prepared substantially according to this Example, except that a microporous film having a breathable continuous hydrophilic polymer coating on one side was used in place of the microporous film described above. The hydrophilic layer was coated according to U.S. Pat. No. 6,074,738. The carbon functional layer described above was layered with this film on each side (with hydrophilic polymer side facing towards the carbon). This construction was further layered with the nyco fabric on one side and with the P837 knit on the other side. The MVTR of the package was measured. Results are included in Table 5.

TABLE 5

Average Moisture Vapor Transmission.

| Construction | Average MVTR, g/m2/day |
|---|---|
| No microporous film | 8800 |
| Microporous film | 7927 |
| Microporous film with hydrophilic polymer layer | 3829 |

The results indicate that the construction having a microporous film has a similar MVTR compared to samples without a microporous film. A reduction in MVTR is observed in samples having a continuous breathable polymer layer.

The invention claimed is:

1. A protective covering comprising:
   first and second oleophobic microporous films coated or treated with an oleophobic material,
   activated carbon impregnated through a knit textile sheet, the entire knit textile sheet coated with activated carbon, contained between the first and second oleophobic microporous films and attached to the oleophobic microporous films by discontinuous attachments,
   at least one first additional material, treated with a hydrophobic or oleophobic material, adjacent the first microporous film and opposite the activated carbon impregnated knit textile sheet, and
   at least one second additional material, treated with a hydrophobic or oleophobic material, adjacent the second microporous film and opposite the activated carbon impregnated knit textile sheet,
   wherein the protective covering is air permeable having a Gurley number of less than 120 seconds and has a permeation of less than 50 µg/cm$^2$ to 2-chloroethyl sulfide (2-CES) after contamination by diesel fuel.

2. The protective covering of claim 1 wherein at least one of the microporous films comprises expanded polytetrafluoroethylene (ePTFE).

3. The protective covering of claim 1 wherein at least one of the microporous films comprises an oleophobic coating comprising at least one material selected from fluoroacrylates, fluorinated polyethers, fluorourethanes, fluorosilicones, and amorphous fluoropolymers.

4. The protective covering of claim 2 wherein the microporous ePTFE film comprises an oleophobic coating comprising at least one material selected from fluoroacrylates, fluorinated polyethers, fluorourethanes, fluorosilicones, and amorphous fluoropolymers.

5. The protective covering of claim 1 wherein the oleophobic microporous films have an oil rating greater than or equal to 4.

6. The protective covering of claim 1 wherein at least one of the oleophobic microporous films has an oil rating greater than or equal to 6.

7. The protective covering of claim 1 wherein at least one of the microporous films is attached to the activated carbon impregnated knit textile sheet by discontinuous adhesive bonds.

8. The protective covering of claim 1, wherein the activated carbon impregnated knit textile sheet further comprises at least one other material selected from adsorptive and reactive materials.

9. The protective covering of claim 1, comprising less than 200 g/m$^2$ activated carbon.

10. The protective covering of claim 1, comprising less than 150 g/m$^2$ activated carbon.

11. The protective covering of claim 1, comprising less than 100 g/m$^2$ activated carbon.

12. The protective covering of claim 1 wherein at least one of the first and second additional materials is a backing material.

13. The protective covering of claim 12 wherein the protective covering has an MVTR of greater than 2000 g/m$^2$/day.

14. The protective covering of claim 12 wherein the protective covering has an MVTR of greater than 4000 g/m$^2$/day.

15. The protective covering of claim 12 wherein the protective covering has an MVTR of greater than 6000 g/m$^2$/day.

16. The protective covering of claim 1 wherein the protective covering has an MVTR of greater than 4000 g/m$^2$/day.

17. The protective covering of claim 1 wherein the protective covering has an MVTR of greater than 6000 g/m$^2$/day.

18. The protective covering of claim 1, wherein the knit textile sheet impregnated with activated carbon comprises at least one functional material having one or more of adsorptive, absorptive, reactive, or catalytic properties.

19. A protective covering comprising:
   first and second microporous films treated or coated with an oleophobic material, and
   activated carbon impregnated through and coated on to a woven or knit textile substrate wherein the entire textile is coated with activated carbon, contained between the first and second microporous films and the activated carbon coated substrate is directly attached to the first and second microporous films by discontinuous adhesive attachments,
   a shell fabric material, treated with an oleophobic or hydrophobic material, that is adjacent the first oleophobic microporous film on a side opposite the textile substrate impregnated with activated carbon, and
   a backing material treated, with an oleophobic or hydrophobic material, that is adjacent the second oleophobic microporous film on a side opposite the textile substrate impregnated with activated carbon,
   wherein the protective covering has an air permeability of less than 120 Gurley seconds.

20. A protective covering of claim 19 wherein at least one of the microporous films comprises expanded polytetrafluoroethylene (ePTFE).

21. A protective covering of claim 19 comprising less than 200 g/m$^2$ activated carbon.

22. The protective covering of claim 19 having a moisture vapor permeation of greater than 4000 g/m$^2$ per day.

23. The protective covering of claim 19 having a moisture vapor permeation of greater than 6000 g/m$^2$ per day.

24. A protective covering of claim 19 comprising less than 100 g/m$^2$ activated carbon.

25. The protective covering of claim 19, wherein the textile substrate impregnated with activated carbon comprises at least one additional material having one or more of adsorptive, absorptive, reactive, or catalytic properties.

26. A protective covering comprising:
   first and second microporous films treated or coated with an oleophobic material,
   activated carbon impregnated through a textile substrate, the entire textile coated with activated carbon, contained between the first and second microporous films and attached directly to the first and second microporous films by discontinuous attachments,
   at least one first additional material treated with a hydrophobic or oleophobic material adjacent the first microporous film and opposite the activated carbon impregnated textile sheet, and
   at least one second additional material treated with a hydrophobic or oleophobic material adjacent the second microporous film and opposite the activated carbon impregnated textile sheet,
   wherein the protective covering is air permeable having a Gurley number of less than 120 seconds.

27. The protective covering of claim 26 wherein at least one of the microporous films comprises expanded polytetrafluoroethylene (ePTFE).

28. The protective covering of claim 27 wherein at least one ePTFE film comprises an oleophobic coating comprising at least one material selected from fluoroacrylates, fluorinated polyethers, fluorourethanes, fluorosilicones, and amorphous fluoropolymers.

29. The protective covering of claim 26 wherein at least one of the microporous films comprises an oleophobic coating comprising at least one material selected from fluoroacrylates, fluorinated polyethers, fluorourethanes, fluorosilicones, and amorphous fluoropolymers.

30. The protective covering of claim 26 wherein at least one of the oleophobic microporous films has an oil rating greater than or equal to 4.

31. The protective covering of claim 26 wherein at least one of the oleophobic microporous films has an oil rating greater than or equal to 6.

32. The protective covering of claim 26 wherein the textile substrate impregnated with activated carbon further comprises at least one other material selected from adsorptive and reactive materials.

33. The protective covering of claim 26 wherein the textile substrate is a knit textile sheet coated with activated carbon.

34. The protective covering of claim 26 comprising less than 200 g/m² activated carbon.

35. The protective covering of claim 26 comprising less than 150 g/m² activated carbon.

36. The protective covering of claim 26 comprising less than 100 g/m² activated carbon.

37. The protective covering of claim 26 wherein at least one of the at least one additional materials is selected from a shell fabric and a backing material.

38. The protective covering of claim 26 wherein the protective covering has an MVTR of greater than 4000 g/m²/day.

39. The protective covering of claim 26 wherein the protective covering has an MVTR of greater than 6000 g/m²/day.

40. The protective covering of claim 26 having a 2-chloroethyl sulfide (2-CES) permeation of less than 50 µg/cm² after contamination by diesel fuel.

41. The protective covering of claim 26 having a 2-chloroethyl sulfide (2-CES) permeation of less than 20 ug/cm² after contamination by sebum.

42. The protective covering of claim 26 having a 2-chloroethyl sulfide (2-CES) permeation of less than 20 ug/cm² after 6 wash/dry cycles.

43. The protective covering of claim 26, wherein the textile substrate impregnated with activated carbon comprises at least one additional material having one or more of adsorptive, absorptive, reactive, or catalytic material properties.

44. The protective covering of claim 26 wherein the textile substrate comprises a non-woven textile sheet.

45. A protective covering comprising
first and second microporous films coated or treated with an oleophobic material,
activated carbon impregnated through a woven textile sheet, the entire woven textile sheet coated with activated carbon, contained between the first and second oleophobic microporous films and attached to the microporous films by discontinuous attachments,
at least one first additional material, treated with an oleophobic or hydrophobic material, adjacent the first microporous film and opposite the activated carbon impregnated woven textile sheet, and
at least one second additional material treated with an oleophobic or hydrophobic material adjacent the second microporous film and opposite the activated carbon impregnated woven textile sheet,
wherein the protective covering comprises less than 200 g/m² activated carbon, and the protective covering is air permeable having a Gurley number of less than 120 seconds.

46. The protective covering of claim 45 wherein the first and second microporous films comprise expanded polytetrafluoroethylene (ePTFE).

47. The protective covering of claim 45 wherein the activated carbon-impregnated sheet is adhesively bonded to the microporous films.

48. The protective covering of claim 45, wherein at least one of the oleophobic microporous films has an oil rating of greater than or equal to 4.

49. The protective covering of claim 45, wherein at least one of the oleophobic microporous films has an oil rating of 6 or greater.

50. The protective covering of claim 45 wherein the first and second oleophobic microporous films have an oil rating greater than or equal to 4.

51. The protective covering of claim 45 wherein the activated carbon-impregnated sheet comprises less than 150 g/m² carbon.

52. The protective covering of claim 45 wherein the activated carbon-impregnated sheet comprises less than 100 g/m² carbon.

53. The protective covering of claim 45 wherein the activated carbon-impregnated sheet further comprises at least one additional material selected from adsorptive and reactive materials.

54. The protective covering of claim 45 wherein at least one of the at least one additional materials is selected from a shell fabric and a backing material.

55. The protective covering of claim 54 wherein the protective covering has an MVTR of greater than 2000 g/m²/day.

56. The protective covering of claim 54 wherein the protective covering has an MVTR of greater than 4000 g/m²/day.

57. The protective covering of claim 54 wherein the protective covering has an MVTR of greater than 6000 g/m²/day.

58. The protective covering of claim 54 having a 2-chloroethyl sulfide (2-CES) permeation less than 50 µg/cm² after contamination with diesel fuel.

59. The protective covering of claim 58 having a 2-chloroethyl sulfide (2-CES) permeation of less than 20 µg/cm² after contamination by sebum.

60. The protective covering of claim 45, wherein the woven textile sheet coated through with activated carbon comprises at least one additional material having one or more of adsorptive, absorptive, reactive, or catalytic properties.

61. A protective covering comprising
first and second microporous films,
activated carbon impregnated through a woven or knit textile sheet wherein the entire sheet is coated with activated carbon, the activated carbon impregnated textile sheet contained between the first and second microporous films and attached to the microporous films by discontinuous attachments,
at least one first additional material adjacent the first microporous film and opposite the activated carbon impregnated textile sheet, and
at least one second additional material adjacent the second microporous film and opposite the activated carbon impregnated textile sheet,
wherein both of the microporous films are coated or treated with an oleophobic material,
wherein the first and second additional materials are treated with a hydrophobic or oleophobic material, and the protective covering is air permeable having a Gurley number of less than 120 seconds.

62. The protective covering of claim 61 wherein at least one of the first and second oleophobic microporous films has an oil rating of 4 or greater.

63. The protective covering of claim 61 wherein at least one of the first and second oleophobic microporous films has an oil rating of 6 or greater.

64. The protective covering of claim 61 further comprising at least one additional material layer selected from shell and backing material.

65. The protective covering of claim 61 wherein at least one of the microporous films comprises expanded polytetrafluoroethylene (ePTFE).

66. The protective covering of claim 61 wherein the first and second microporous films comprise ePTFE.

67. The protective covering of claim 61 wherein at least one of the first and second microporous films comprises an oleophobic coating comprising at least one material selected from fluoroacrylates, fluorinated polyethers, fluorourethanes, fluorosilicones, and amorphous fluoropolymers.

68. The protective cover of claim 61 wherein the activated carbon impregnated textile sheet further comprises at least one additional material selected from adsorptive and reactive material.

69. The protective covering of claim 61 comprising less than 200 g/m² carbon.

70. The protective covering of claim 61 comprising less than 150 g/m² carbon.

71. The protective covering of claim 61 comprising less than 100 g/m² carbon.

72. The protective covering of claim 61 wherein the textile sheet comprises a knit textile.

73. The protective covering of claim 61 wherein the woven or knit textile sheet is attached to the microporous films by adhesive bonds.

74. The protective covering of claim 61 having a 2-chloroethyl sulfide (2-CES) permeation of less than 50 μg/cm² after contamination by diesel fuel.

75. The protective covering of claim 74 having a 2-chloroethyl sulfide (2-CES) permeation of less than 20 μg/cm² after contamination by sebum.

76. The protective covering of claim 61 wherein the 2-chloroethyl sulfide (2-CES) permeation is less than 20 μg/cm² after 6 wash/dry cycles.

77. The protective covering of claim 61 having a 2-chloroethyl sulfide (2-CES) permeation less than 20 μg/cm² after contamination by diesel fuel.

78. The protective covering of claim 61 having a moisture vapor permeation of greater than 2000 g/m² per day.

79. The protective covering of claim 61 having a moisture vapor permeation of greater than 4000 g/m² per day.

80. The protective covering of claim 61 having a moisture vapor permeation of greater than 6000 g/m² per day.

81. The protective covering of claim 61, wherein the activated carbon impregnated textile sheet comprises at least one additional material having one or more of adsorptive, absorptive, reactive, or catalytic properties.

82. A protective covering comprising:

first and second microporous films coated or treated with an oleophobic material, a woven or knit textile sheet, impregnated with activated carbon, the entire woven or knit textile sheet coated with activated carbon, contained between the first and second oleophobic microporous films and attached directly to the first and second oleophobic microporous films by discontinuous attachments, a backing material treated with a hydrophobic or oleophobic material positioned between a body of a wearer and the first oleophobic microporous film, having an inner side attached to the first oleophobic microporous film on a side of the first oleophobic microporous film that is opposite the woven or knit textile sheet, and a shell fabric material treated with a hydrophobic or oleophobic material adjacent the second oleophobic microporous film on a side of the second oleophobic microporous film that is opposite the woven or knit textile sheet impregnated with activated carbon, wherein the protective covering is air permeable having a Gurley number of less than 120 seconds.

\* \* \* \* \*